United States Patent
Stiles

(10) Patent No.: US 9,670,624 B1
(45) Date of Patent: Jun. 6, 2017

(54) DOUBLE WALLED EARTH GRABBING WATER PERMEABLE MODULAR PAVER

(71) Applicant: STILES MANUFACTURING, LLC, Houston, TX (US)

(72) Inventor: Barry J. Stiles, Houston, TX (US)

(73) Assignee: Stiles Manufacturing, LLC, Houston, TX (US)

( * ) Notice: Subject to any disclaimer, the term of this patent is extended or adjusted under 35 U.S.C. 154(b) by 0 days.

(21) Appl. No.: 15/360,174

(22) Filed: Nov. 23, 2016

Related U.S. Application Data

(63) Continuation-in-part of application No. 15/255,853, filed on Sep. 2, 2016.

(60) Provisional application No. 62/272,261, filed on Dec. 29, 2015.

(51) Int. Cl.
| | | |
|---|---|---|
| *E01C 5/00* | (2006.01) | |
| *E01C 5/20* | (2006.01) | |
| *E01C 9/08* | (2006.01) | |
| *E01C 15/00* | (2006.01) | |

(52) U.S. Cl.
CPC .................. *E01C 5/00* (2013.01); *E01C 5/20* (2013.01); *E01C 9/08* (2013.01); *E01C 15/00* (2013.01); *E01C 2201/02* (2013.01); *E01C 2201/04* (2013.01); *E01C 2201/12* (2013.01)

(58) Field of Classification Search
CPC .... E01C 11/24; E01C 11/225; E01C 2201/12; E01C 2201/02; E01C 2201/04; E01C 9/004; E01C 9/086; E01C 9/08; E01C 15/00; E01C 5/00; E01C 5/20
See application file for complete search history.

(56) References Cited

U.S. PATENT DOCUMENTS

| | | | |
|---|---|---|---|
| 3,310,906 A | 3/1967 | Glukes | |
| 3,909,996 A * | 10/1975 | Ettlinger, Jr. | E01C 5/20 15/215 |
| 4,111,585 A | 9/1978 | Mascaro | |
| 4,440,818 A | 4/1984 | Buchan et al. | |
| 4,749,302 A | 6/1988 | DeClute | |
| 4,826,351 A * | 5/1989 | Haberhauer | E01C 5/20 404/35 |
| 5,250,340 A | 10/1993 | Bohnhoff | |
| 5,406,745 A | 4/1995 | Lin | |
| 5,527,128 A * | 6/1996 | Rope | E01C 5/20 404/35 |
| 5,628,160 A * | 5/1997 | Kung | E01C 5/20 403/11 |
| 5,848,856 A | 12/1998 | Bohnhoff | |
| 5,992,106 A * | 11/1999 | Carling | E01C 5/20 52/177 |
| 6,301,842 B1 * | 10/2001 | Chaney | E04B 5/12 52/177 |
| 6,451,400 B1 | 9/2002 | Brock et al. | |
| (Continued) | | | |

*Primary Examiner* — Abigail A Risic
(74) *Attorney, Agent, or Firm* — Buskop Law Group, P.C.; Wendy Buskop

(57) ABSTRACT

A double walled earth grabbing water permeable modular paver having a first group of outer cells, a second group of outer cells, a third group of outer cells, a fourth outer cell, a fifth outer cell, and a plurality of inner cells. Each of the plurality of outer cells and inner cells further include an outer wall; an inner wall; a top surface; a plurality of structural support ribs; a permeable bottom portion engaging each inner wall; and a plurality gripping members extending from the permeable bottom portion.

20 Claims, 11 Drawing Sheets

(56) References Cited

U.S. PATENT DOCUMENTS

| | | |
|---|---|---|
| 6,622,440 B2 | 9/2003 | Mercade |
| 7,114,298 B2 | 10/2006 | Kotler |
| 7,210,538 B2 | 5/2007 | Gust et al |
| 7,210,876 B2 | 5/2007 | Moralez et al. |
| 7,571,572 B2 | 8/2009 | Moller |
| 7,815,395 B1 | 10/2010 | Blackwood |
| 7,950,191 B2 | 5/2011 | Brouwers |
| 8,734,049 B1 | 5/2014 | Stiles |
| 2006/0263146 A1* | 11/2006 | Moralez .................. E01C 9/004 404/36 |
| 2008/0052986 A1* | 3/2008 | Son ........................ A63C 19/04 47/31.1 |
| 2008/0072514 A1* | 3/2008 | Barlow .............. A63B 69/3661 52/540 |
| 2012/0163911 A1 | 6/2012 | Culleton et al. |
| 2014/0270945 A1* | 9/2014 | Bach ........................ E01C 5/20 404/36 |

* cited by examiner

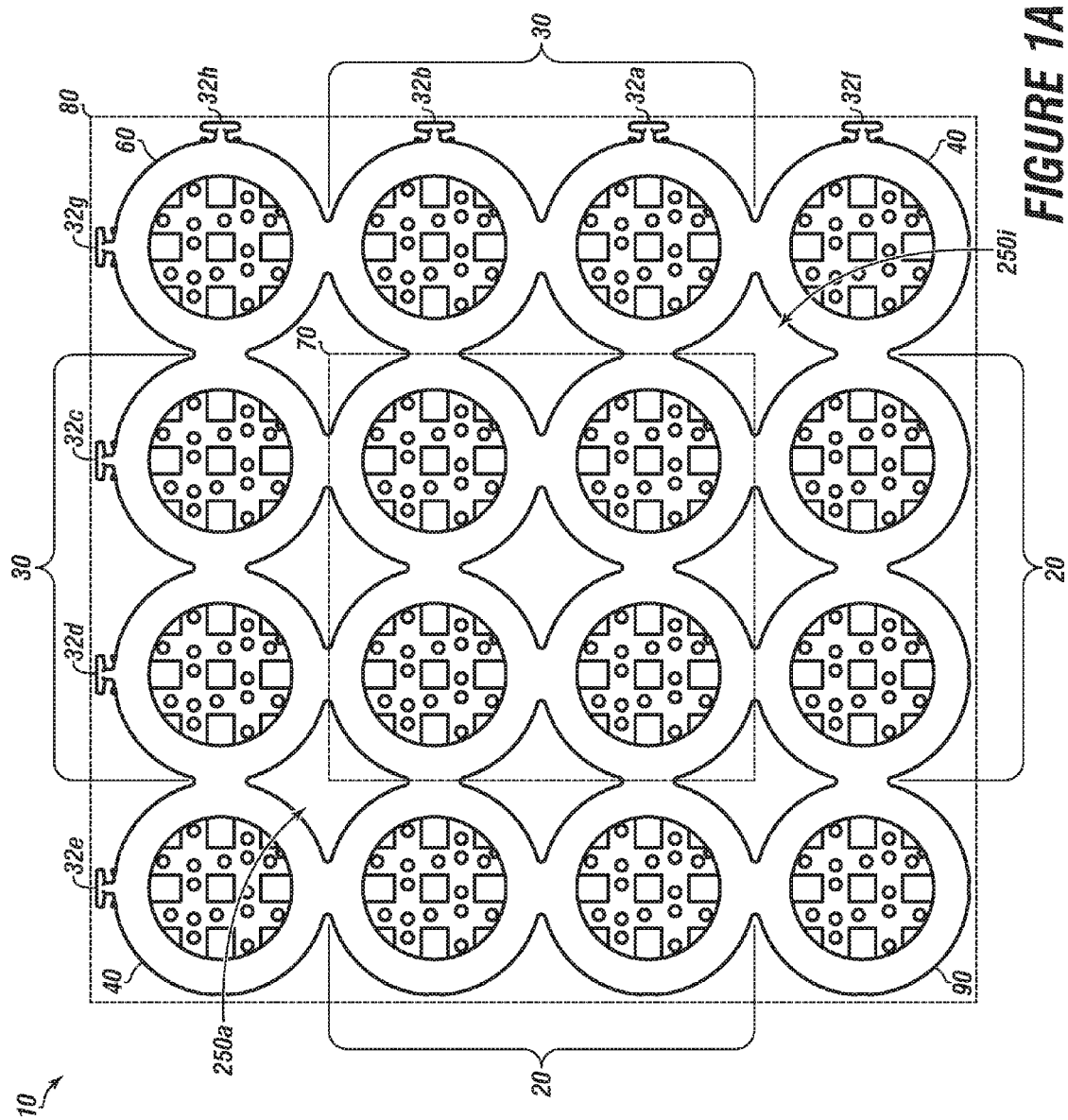

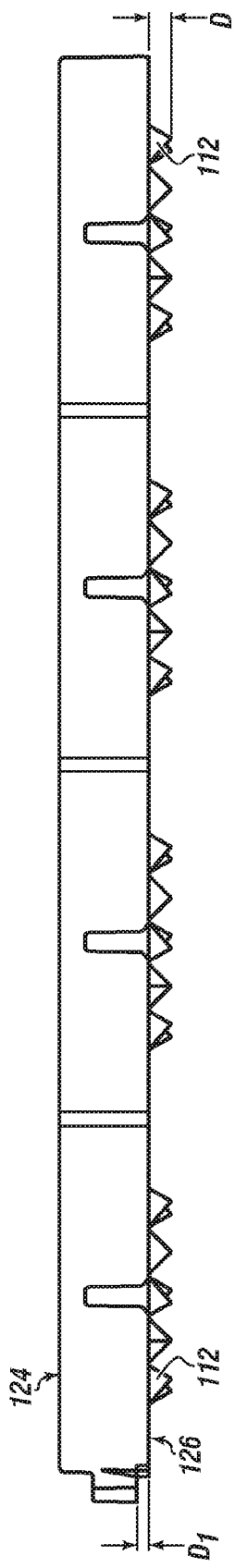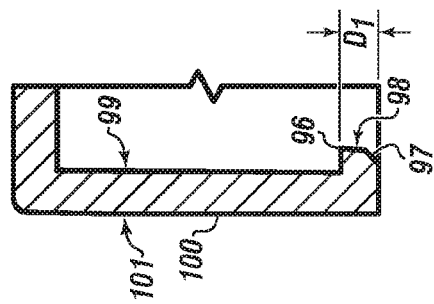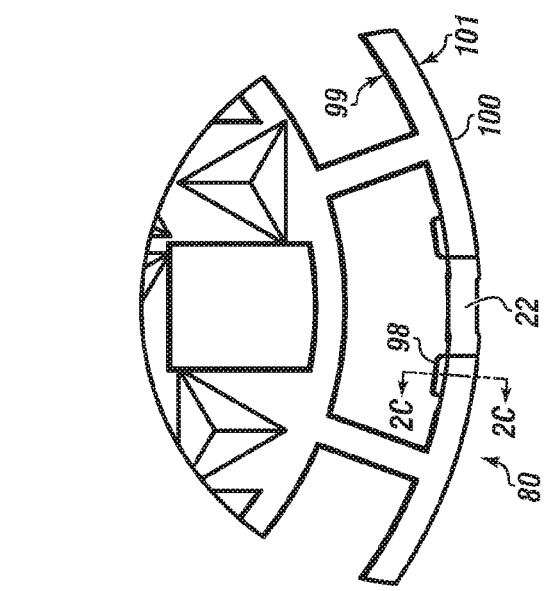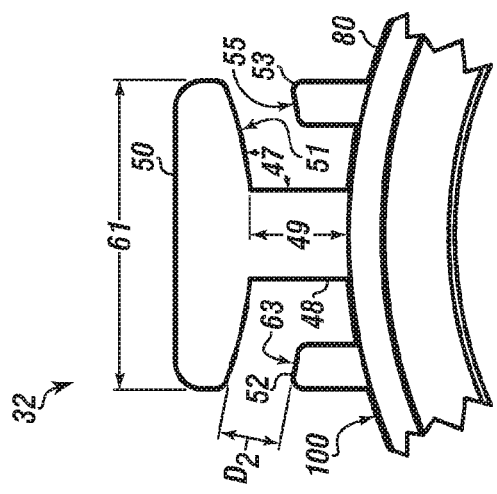

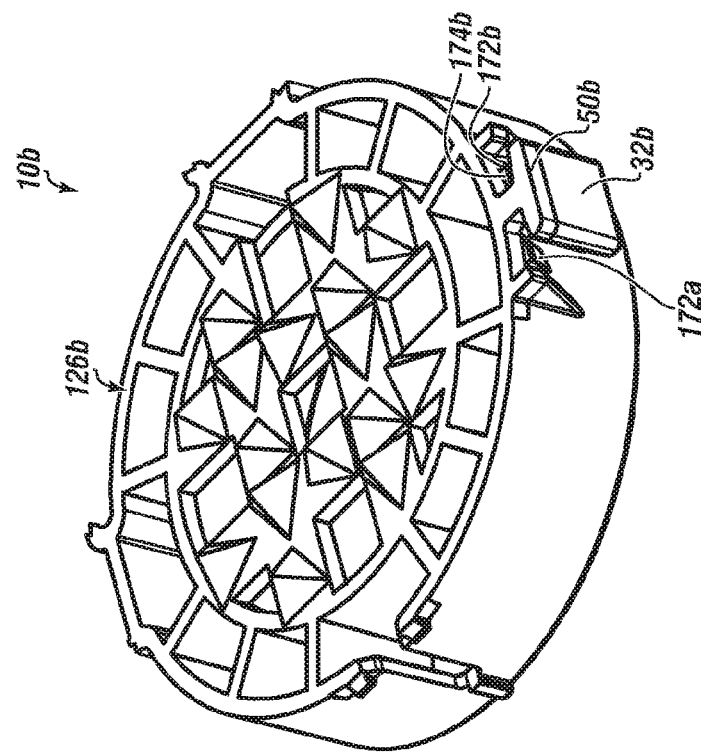
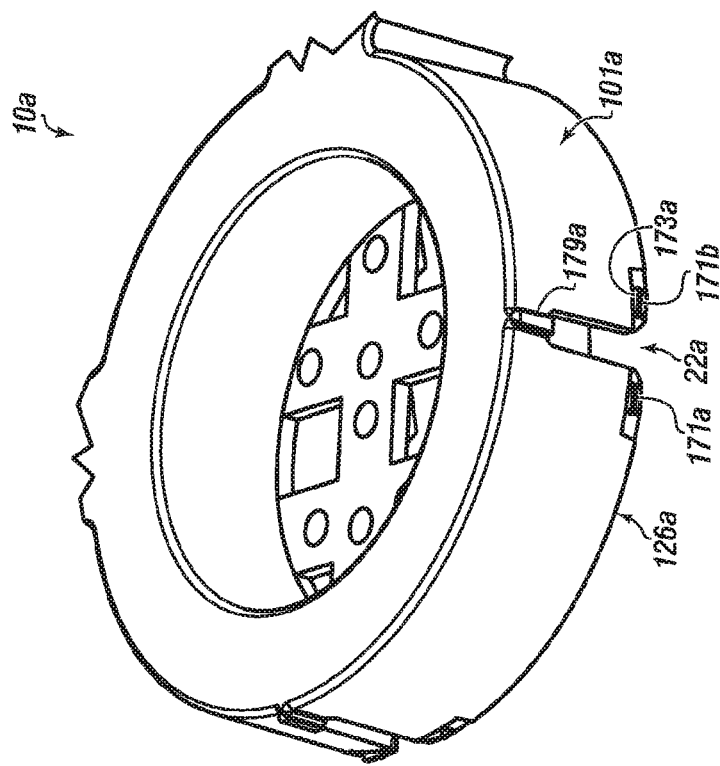

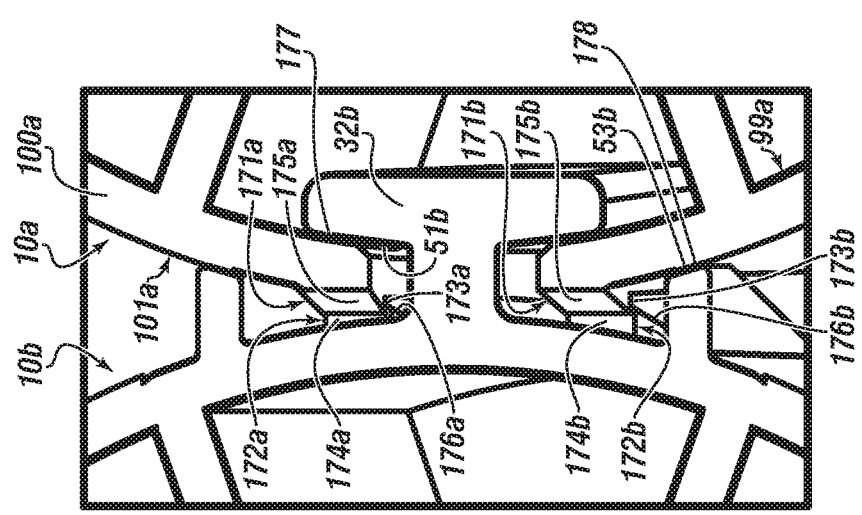

DOUBLE WALLED EARTH GRABBING WATER PERMEABLE MODULAR PAVER

CROSS REFERENCE TO RELATED APPLICATIONS

The current application is a continuation-in-part of co-pending U.S. Non-Provisional patent application Ser. No. 15/255,853, filed Sep. 2, 2016, which claims priority to and the benefit under 35 U.S.C. §119(e) of U.S. Provisional Patent Application Ser. No. 62/272,261, filed on Dec. 29, 2015. The disclosure of each application is hereby incorporated herein by reference in its entirety for all purposes.

FIELD

The present embodiments generally relate to a double walled earth grabbing water permeable paver, (inter)connectable to other pavers to form a traversable surface, such as for high traffic areas, including a parking lot, a roadway, a golf cart path, a trail, a temporary roadway, a bicycle path, or other types of surfaces, such as a jogging trail, a greenway space, a freight yard, a fire lane, a sidewalk, or other areas where it is desirable for water to flow through rather than around or over the surface.

BACKGROUND

A need exists for interconnectable double walled water permeable modular pavers that, when connected or locked together, form a surface that allows traffic and parking surfaces to be formed and that can aid in control of water dissemination, and can also further enable grass to grow through the surface. A need exists for a modular paver to be able to contain and hold a filler material, such as gravel, which allows water to permeate through the surface into the ground.

A need also exists for a water permeable modular paver that can be a one piece molded unit created from recycled plastics, such as recycled milk bottles.

The present embodiments meet these needs.

BRIEF DESCRIPTION OF THE DRAWINGS

The detailed description will be better understood in conjunction with the accompanying drawings as follows:

FIG. 1A depicts a downward top view of a double walled water permeable modular paver according to one or more embodiments.

FIG. 1F depicts a lateral side view of the double walled water permeable modular paver of FIG. 1A according to one or more embodiments.

FIG. 2A depicts a detail view of a locking member according to one or more embodiments.

FIG. 2B depicts an upward looking view of a tapered protruding member formed on an inner surface of an outer wall of an outer cell according to one or more embodiments.

FIG. 2C depicts an underside side view of a keyhole of a respective paver associated with a protruding member according to one or more embodiments.

FIG. 6A depicts a partial view of a double walled earth grabbing permeable paver having a pair of outer wall bottom ribs according to one or more embodiments.

FIG. 6B depicts a partial view of a double walled earth grabbing permeable paver having a pair of outer wall top ribs according to one or more embodiments.

FIG. 6C depicts in part an underside view of a first paver engaged with a second paver according to one or more embodiments.

Figure 1B:
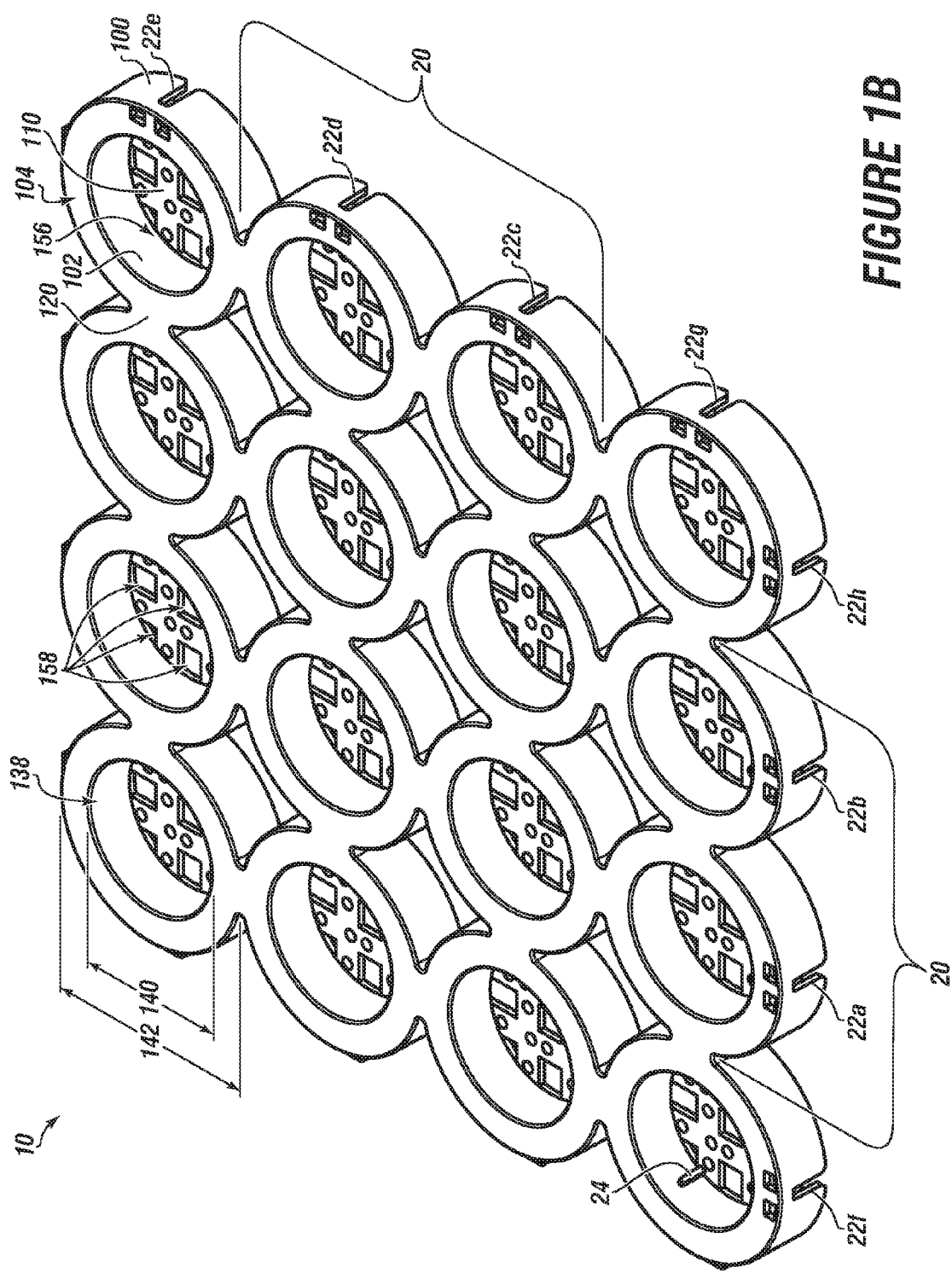
FIG. 1B depicts an isometric top view of the double walled water permeable modular paver of FIG. 1A according to one or more embodiments.
Figure 1C:
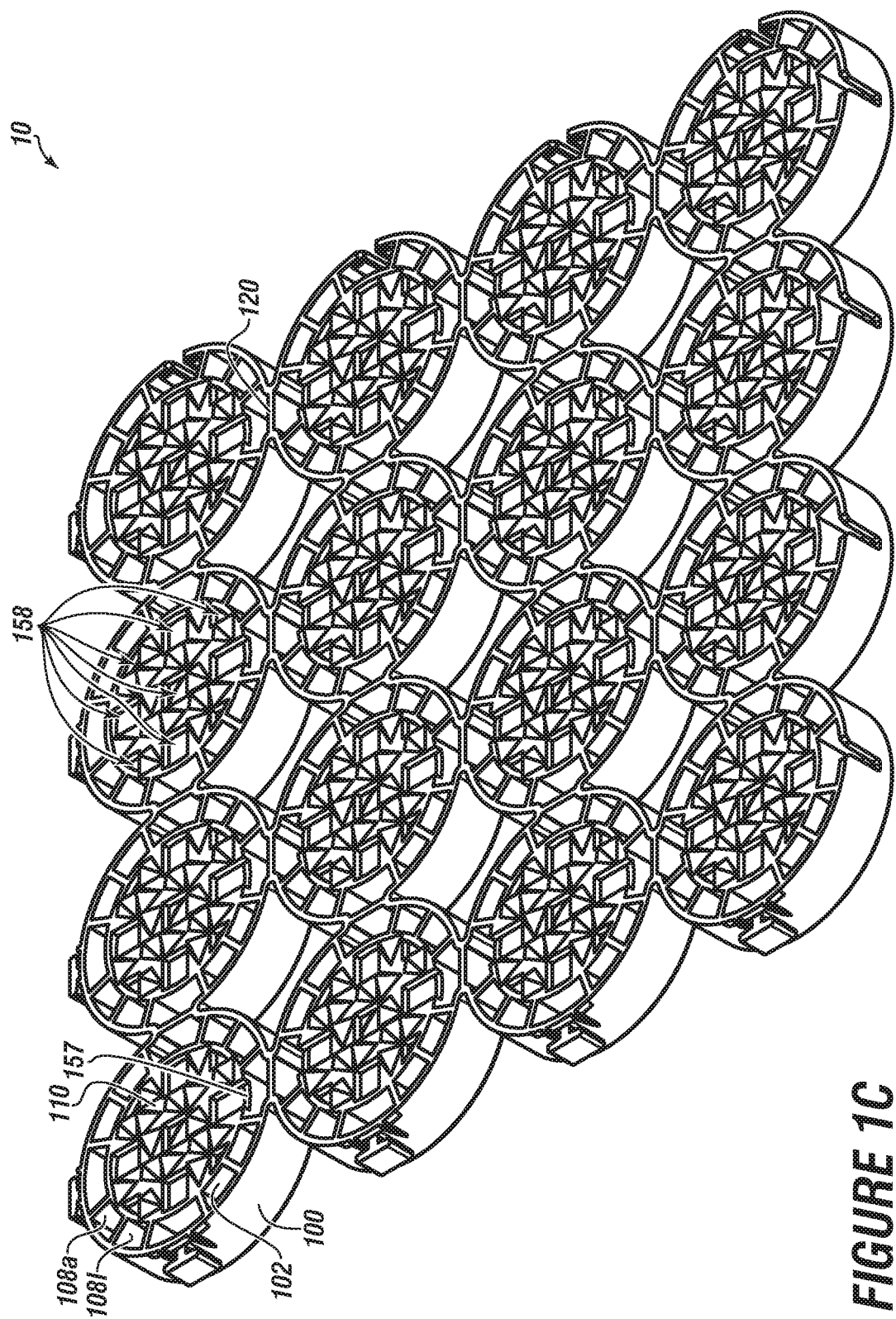
FIG. 1C depicts an isometric bottom view of the double walled water permeable modular paver of FIG. 1A according to one or more embodiments.

The present embodiments are detailed below with reference to the listed Figures.

DETAILED DESCRIPTION OF THE EMBODIMENTS

Before explaining the present apparatus (and related systems and processes) in detail, it is to be understood that the apparatus is not limited to the particular embodiments and that it can be practiced or carried out in various ways.

The embodiments relate to a double walled water permeable modular paver for forming a surface suitable to accommodate a load, such as a pedestrian(s), moving traffic, or parked vehicles.

The double walled water permeable modular paver mitigates or otherwise prevents flash flooding and thereby costly property damage and loss of life, by managing water flow and drainage in areas that otherwise present solid surfaces with little or no ability to absorb or disseminate water.

The double walled water permeable modular paver helps improve the environment by enabling the removal or reduction of diesel, gasoline, oil and other pollutants from storm water through natural bioremediation before these pollutants enter a natural aquifer and poison shrinking water supplies, which could lead to serious illness or death of humans or wildlife.

The double walled water permeable modular paver helps reduce rising temperatures from climate change, and helps reduce environmental damage done to the planet due to the dramatic heating effects caused by the use of concrete and asphalt for traffic and parking surfaces.

The double walled water permeable modular paver improves the health of the planet by utilizing and recycling post-consumer and industrial waste that clogs landfills. The water permeable modular paver can be made of a material of construction made of waste stream product(s), such as plastic trash. The waste stream is recyclable in a manner so that the modular paver of the disclosure can be made of a construction material usable to build parking lots, roadways, sidewalks and other traffic surfaces, including golf cart trails. Thus, the life span of the initial product can be extended.

The double walled water permeable modular paver helps improve lifestyles for the handicapped or disabled persons as well as improve lifestyles for the elderly and children by enabling the construction of unobstructed and safe park trail ways. The water permeable paver of the disclosure enables the construction of access ways to nature conservancies by providing inexpensive, natural grass and gravel ADA compliant walkways. Embodiments of the disclosure provide for the construction of trails that are level and safe, preventing broken bones and other serious injuries and even death due to a fall that may occur on otherwise uneven or unstable surfaces.

The double walled water permeable modular paver can prevent fire disasters by creating erosion resistant structures that include grass filled fire lanes so fire and emergency vehicles don't get stuck in the mud or prevented from reaching remote areas in a disaster as often happens in wildfire situations in California.

The double walled permeable paver can enable police and emergency responders to quickly install a roadway in a muddy area to quickly access a damaged area, especially in the event where a permanent roadway was washed away.

The double walled water permeable paver can provide a roadway for occasional use by emergency vehicles and fire trucks in areas where the expense of a concrete roadway or asphalt roadway is prohibitive. The water permeable paver of the disclosure can enable the creation of inexpensive fire lanes, emergency lanes, and maintenance vehicle lanes.

Embodiments of the disclosure relate to a double walled water permeable paver that can be interlocked (e.g., interconnected, connected, coupled, etc.) together with other pavers to create a system, which can beneficially provide soil stabilization. Soil stabilization can be achieved by connecting a plurality of double walled water permeable pavers together and filling the cells of the water permeable pavers with a filler material, such as soil or aggregate.

Embodiments of the disclosure relate to a double walled water permeable paver for use with a storm water management system. Storm water management can be achieved by interconnecting together a plurality of one piece water permeable pavers and installing the interconnected water permeable pavers adjacent a bayou or waterway, or other form of fluid storage structure.

Embodiments of the disclosure relate to a road or other traversable (or navigable) surface formed from interconnected double walled water permeable pavers which have inner and/or outer cells filled with a filler material, such as an aggregate.

Embodiments of the disclosure relate to a parking lot formed from interconnected double walled water permeable modular pavers that have cells filled with a filler material, such as dirt, grass, or aggregate. In aspects, the parking lot can be an occasional use event parking lot or an industrial parking lot for staging of oil field drilling equipment.

Embodiments of the disclosure relate to a modular paver that utilizes a double walled configuration that is beneficial and desirable for added strength, rigidity, and duration of life. The double walled configuration means the paver of the disclosure can be suitable for extreme environments, such as military applications, construction zones, and high-volume traffic areas.

The term "modular paver" as used herein can refer to a paver or paver unit of a certain size, material of construction, and design, that can be connected with additional modular pavers of a similar (or exact) size, material of construction, and design.

The term "cell" as used herein can refer to a unit sized portion of a modular paver. The modular paver and have multiple interconnected cells that are generally similar (or exact) in nature. For example, a cell can be generally round in nature with a discernable depth and width (such as an inner wall cell diameter) resulting in a cell volume. The cell volume can be filled (including at least partially, substantially entirely, or completely) with a filler material. In embodiments, a paver can have between about 5 to about 40 cells. The term "cell" can refer to the cylindrical molded shapes which are connected to other cells to form the double walled water permeable modular paver. A cell(s) can have a number of shapes, including elliptical, rectangular, square or another polygon.

The term "connected" as used herein with respect to a paver can be meant to convey a relationship of position, such as one 'cell' being adjacent and coterminous to another cell. "Connected" does not have to mean that the cells are initially separated and need to be 'connected' together; instead, cells are connected, directly or indirectly, in a positionable relationship manner that results in an integral one piece modular paver. 'Connected' and 'interconnected' can have the same or analogous meaning and can have an interchangeable meaning. Connected can also refer to a positionable relationship between two or more pavers.

The term "interlocked" as used herein can refer to a positionable relationship two or more pavers that have respective keyways and locking members mated (i.e., connected, etc.) together. 'Interlocked' is not meant to mean pavers are not readily or easily disconnectable from one another.

The term "double walled" as used herein can refer to a cell that has a first or inner wall and a second or outer wall. In general the outer wall can have a larger diameter (or outer wall cell diameter) than a diameter of the inner wall (or inner wall cell diameter). Accordingly, there can be a discernable gap or volume of space between the outer wall and the inner wall that is void of paver material.

The term "outer wall" as used herein can refer to a structure of a cell that is outermost to a center point of the cell. The outer wall of one cell may conjoin with an outer wall of another cell.

The term "inner wall" as used herein can refer to a structure of a cell that is innermost to a center point of the cell, and typically has an inner wall cell diameter less than that of the outer wall cell diameter. The inner wall in connection with a permeable bottom portion can define a cell volume suitable for a filler material to be disposed therein.

The term "third wall" as used herein can refer to an area (or structure, surface, etc.) between two respective cells where the outer walls of the respective cells are conjoined together. This can also be described as one cell being at least partially coterminous with another cell.

The term "earth grabbing" as used herein can refer to an ability of the paver to 'grab' into an earthen surface in a manner that can provide stable positioning of the paver with respect to the earthen surface.

The term "water permeable" as used herein can refer to a structure of the paver that permits a fluid, such as water, to pass therethrough. For example, rainfall, instead of accumulating in stagnation, pooling, or runoff, can instead permeate through the paver into the ground.

The term "keyway" as used herein can refer to a slot or other comparable 'female' structure formed in a cell of the paver that can facilitate an interlocking connection with a respective locking member of another paver.

The term "locking member" as used herein can refer to a protrusion or other comparable 'male' structure extending from a cell of the paver that is matable with a respective keyway of another paver.

The term "marker insert" as used herein can refer to an insert, which can be plastic, and which provides a visual indicator creating parking zones or parking areas, and a plurality of the marker inserts, used in a plurality of cells of the paver can create a parking series of dots, acting like a parking stripe. The marker insert can be non-deforming when driven over by a motorized vehicle.

The term "group of outer cells" as used herein can refer to an arrangement of cells conjoined together in a manner that forms a perimeter of a modular paver. An outer cell can have a keyway, a locking member, one of each, two keyways, or two locking members.

The term "corner cell" as used herein can refer to an outer cell that can be connectively adjacent two other outer cells of a respective paver.

The term "group of inner cells" as used herein can refer to an arrangement of cells conjoined with each other and/or outer cells. Inner cells typically lack a keyway or a locking member. Inner cells can be positionably described as being connectively adjacent four other cells of a respective paver.

The term "top surface" as used herein can refer to a cell surface (including planar or substantially planar) that is integrally connected between the inner wall and outer wall of the respective cell. The top surface can be load bearing.

The term "locating rib" as used herein can refer to a structure formed on the inner wall of a respective cell that aids the insertion and positioning of a marker insert.

The term "structural support rib" as used herein can refer to a structure formed between an outer wall and inner wall of a respective cell of the paver. The support rib can be formed integrally connected to the top surface, outer wall, and inner wall of the respective cell. The structural support rib can aid in providing support to the load bearing function of the paver.

The term "permeable bottom portion" as used herein can refer to a bottom surface structure of a cell that allows or facilitates a fluid to pass therethrough. The surface structure can have, for example, one or more holes cut therein. From a certain viewpoint, the surface structure with various holes or cutouts can resemble a pattern, such as hashtag, zig-zag, and so forth.

The term "tapered protruding member" as used herein can refer to a structure, which can be integral, associated with the bottom inner wall surface structure of a cell that extends outwardly (e.g., downward when the paver is positioned on the ground) therefrom. The protruding member can provide load-bearing support for a locking member of another paver.

The term "fill material" as used herein can refer to particulate material, such as aggregate, such as gravel, sand, mulch, recycled rubber particles, recycled glass pieces, grass, sod, and wood chips. The fill material can be filled into a cell volume. The fill material together with the one or more interlocked pavers can form a traversable surface.

The term "integral" as used herein can refer to a modular paver that is entirely one piece. A modular paver that is integral can be easily molded.

The term "load" as used herein can refer to pressure in pounds per square inch (psi) that is applied onto the permeable paver, such as, the psi applied by an 80-pound child or the psi applied by a 40-ton truck. The double walled permeable pavers are designed to support transitory or stationary loads of the 40-ton truck without deforming. The double walled water permeable paver can readily bear an 8000 psi load.

The term "load bearing" as used herein can refer to the ability to bear or support a load.

The term "parking lot space" as used herein can refer to a marked area for a moving vehicle, such as a car, truck, trailer, golf cart, motorcycle, connected truck and trailer, recreational vehicle, which is out of a lane of transit and enables a driver to leave the vehicle for at least a short period of time.

The term "preset geographic area" as used herein can refer a particular area or group of areas, physically connected or in communication with each other through a network, such as a parking lot space, a traffic lane, golf cart trails, natural trails, bike trails, running trails, stadium parking, large concert and expo venue sites, airports, train stations, hotel parking lots, fire lanes and exit zones from theme parks.

The term "traffic lane" as used herein can refer to a lane of a thoroughfare, such as a roadway, an entrance ramp, a drive lane within a parking lot, a feeder road to another road, an access road, or a lane deviation within a roadway due to maintenance or other road work.

Referring to the Figures, FIGS. 1A, 1B, 1C, 1D, 1E, and 1F, a downward top view; an isometric top view; an isometric bottom view; a rotated isometric bottom view; and an upward bottom view, of a double walled water permeable modular paver in accordance with embodiments of the disclosure, are shown.

FIGS. 1A-1F together show a double walled earth grabbing water permeable modular paver 10 (or "paver" or "modular paver" for short) that includes a plurality of connected cells (directly or indirectly). The cells can be connected in a manner that forms a particular paver shape, such as rectangular, square, trapezoidal, symmetrical, asymmetrical, or any other suitable shape. Moreover one or more cells of the paver 10 can be varied in shape, such as circular, in order to accommodate certain paver shapes.

The figures illustrate the paver 10 having circular-shaped cells 70, 80 arranged in a 4-cell×4-cell square configuration. The paver 10 can have a size (L×W) of a range of about 5"×5 to about 48"×48". In an embodiment the paver 10 can have a size of about 24" (L) to about 24" (W). Although shown as 'square', the paver 10 does not have to have equal length and width. However, the square nature of the embodiment depicted in FIGS. 1A-1F provides desirable modularity, and can reduce storage and shipping cost. A symmetrical shape can aid in architectural modeling design and use of the paver 10.

The paver 10 can have a weight in a range of about 3 lbs. to about 10 lbs. The paver 10 can have a material of construction, which can be, for example a polyethylene-based material. In an embodiment the material of construction can be an eco-friendly post-use recycled HDPE. In an embodiment the material of construction can be nylon-based, which can be useful to aid the paver 10 in withstanding effects of temperature and other unfavorable factors related to use of the paver 10 in the ground.

As the paver 10 can be integral and one piece in its construction, the paver 10 can be readily manufactured through a conventional molding process, such as injection molding. The paver 10 can be configured to withstand a load of up to about 8,000 psi, but loads in excess of 8,000 remain possible.

The modular paver 10 can include a plurality of outer cells 80 that can form a perimeter around a plurality of inner cells 70. The pattern or arrangement of the outer cells 80 can be described by grouping the cells by similar structure. Thus, there can be a first group 20 of outer cells 80, each respectively comprising a keyway 22 (See FIG. 1B, keyways 22a-b, and FIG. 1D, keyways 22c-d). In an embodiment the first group 20 can include about 4 outer cells 80. One or more cells 80 of the first group 20 can be connected directly and/or indirectly with other cells 80 of the first group 20.

The keyway(s) 22 can be formed in a generally outer tangential portion of its respective outer cell wall 100. The keyway 22 can be a 'groove' formed in the outer wall 100 that can be approximate to about 1" in height from a bottom (126, FIG. 1F) of the paver 10, and can be about ⅜" to about ¾" wide.

There can be a second group 30 of outer cells 80, each respectively comprising a locking member 32 (See FIG. 1A, locking members 32a-d). In an embodiment the second group 30 can include about four outer cells 80. One or more cells 80 of the second group 30 can be connected directly and/or indirectly with other cells 80 of the second group 30.

The locking member(s) 32 can have a protruding "T" shape (from downward or upward view) from the outer wall 100, extending about ½" inch therefrom.

There can be a third group 40 of outer cells 80. The outer cells 80 of the third group 40 can each respectively include the keyway 22 (see, e.g., keyways 22e-f of FIG. 1B) and the locking member 32 (see, e.g., locking members 32e-f of FIG. 1A). In an embodiment the second group 40 can include about two outer cells 80. One or more outer cells 80 of the third group 40 can be a corner cell.

There can be a fourth outer cell 90, which can be a corner cell. The fourth outer cell 90 can include two keyways 22g-h.

There can be a fifth outer cell 60, which can be a corner cell. The fifth outer cell 60 can include two locking members 32g-h.

The paver 10 can include a plurality of inner cells 70. One or more of the plurality of inner cells 70 can be positionably adjacent and conjoined with four other cells, which can be inner cells and/or outer cells.

In aspects, at least one or more of the first group 20 of outer cells 80 can be connected to the fourth outer cell 90. In aspects, at least one of the first group 20 of outer cells 80 can be connected to an adjacent cell of the third group 40 of outer cells 80, and/or can be connected to at least one of the plurality of inner cells 70. In aspects, at least one of the second group 20 of outer cells 80 can be connected to at least one of: an adjacent cell of the third group 40 of outer cells 80, to the fifth outer cell 60, to one of the plurality of inner cells 70, and combinations thereof.

The paver 10 can include a plurality of third walls 120. One or more of the plurality of third walls can connect: one of the outer cells 80 with one of the inner cells 70, one of the outer cells 80 with another one of the outer cells 80, or one of the inner cells 70 with another one of the inner cells 70.

The paver can include a plurality of gaps 250a, 250b formed between four connected cells, each gap, and a top 124, and a bottom 126 of the paver 10.

The paver 10 can include a light module (not shown here) in at least one of the outer cells 80, the inner cells 70, and combinations thereof.

The locking members 32 for each respective outer cell 80 can be formed integral to the respective outer wall 100 between the bottom 126 and the top 124 of the paver 10.

The keyways 22 for each respective outer cell 80 can be cut from the bottom 126 of the paver 10, including partially to substantially, towards the top 124.

The top surface 104 can be substantially planar. The paver can be made of recycled plastic. The plurality of inner cells 70 can have about four inner cells. The plurality of outer earth cells 80 can have about twelve outer cells.

The permeable bottom portion 110 comprises a predetermined pattern 130 in the form of at least one of an I, H, X, W, M, L, Z, and the hashtag ('#') symbol.

Each of the outer cells 80 and the inner cells 70 can include a locating rib 24 formed on the respective inner wall 102.

The paver 10 can include a plurality of gaps 250a, 250b formed between four connected cells each gap and the top 124 and the bottom 126 of the paver.

Figure 5:
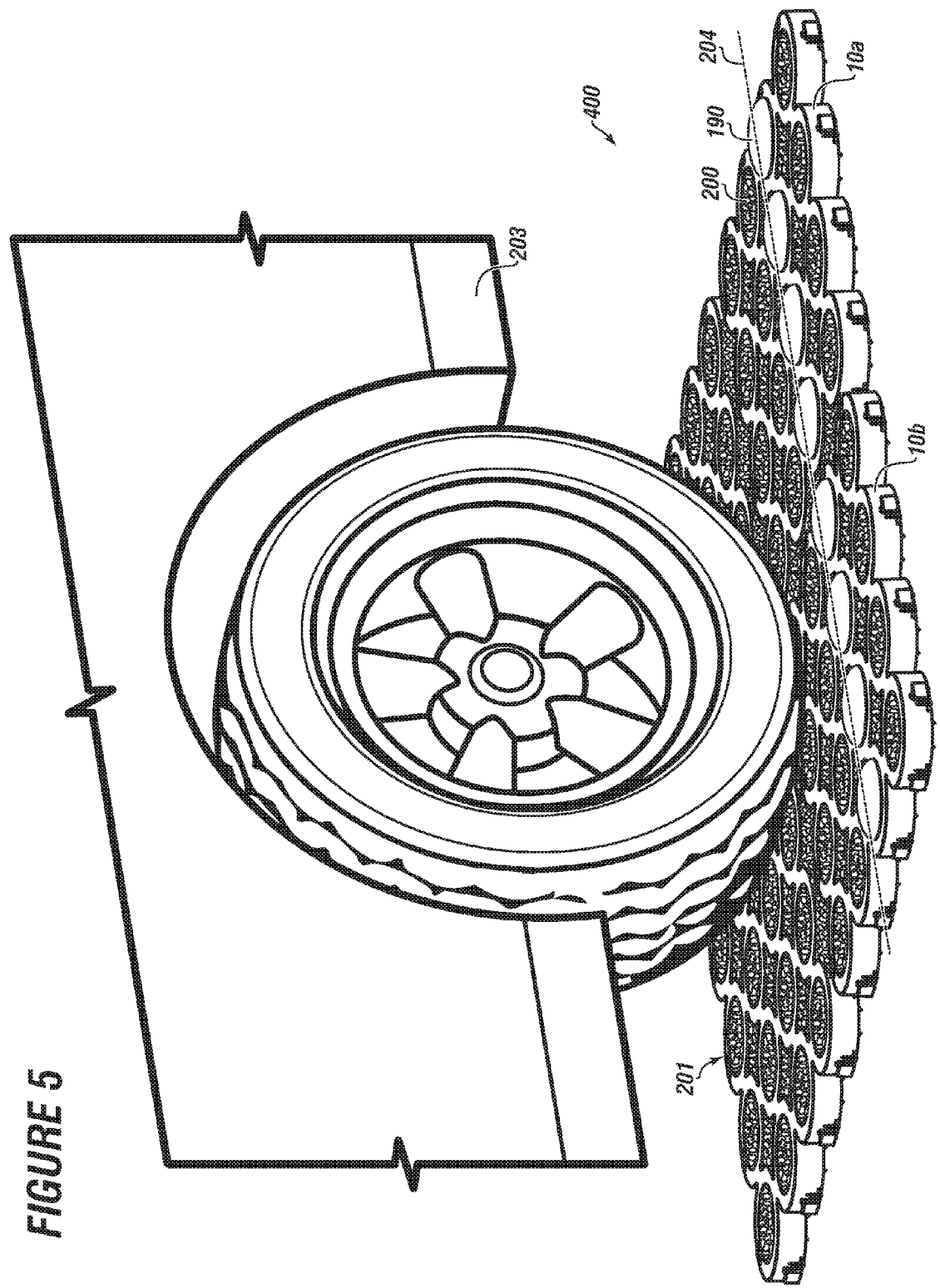
FIG. 5 depicts a plurality of double walled earth grabbing permeable pavers interlocked together to form a paver system for use as a traversable load bearing surface according to one or more embodiments.

Multiple pavers 10 can be connected together to form a load bearing traffic surface (see FIG. 5).

While inner cells 70 and outer cells 80 can have differences in terms of, for example, relational position and structure, the inner cells 70 and outer cells 80 of the paver 10 can include a number of common features and sub-features, such as being circular or ring-shape in nature.

As shown in the Figures, each of the plurality of outer cells 70 and inner cells 80 can include an outer wall 100; an inner wall 102; a top surface 104 integrally formed or connected between the outer wall and the inner wall; and a plurality of structural support ribs 108a-l integrally formed or connected between the top surface 104, the outer wall 100, and the inner wall 102.

The inner wall 102 can help define a cell volume 138. For example, the inner wall 102 can have a circular shape with an inner wall diameter 140 and an inner wall height H. The inner wall diameter can be in a range of about 2" to about 6". In an embodiment the inner wall diameter can be about 4".

The height H can be in a range of about 0.5" to about 4". In an embodiment the height h can be about 1.5".

The inner wall 102 may have an inner wall thickness 150 that can be in the range of about 0.005" to about 0.5". In an embodiment, the thickness 150 can be about 0.15" to about 0.3"

The cell volume 138 can be filled with a filler material (200, FIG. 5). The filler material can be a suitable earthen material, such as gravel, grass (seed or sod), mulch, recycled glass, rock, stone, recycled/crushed concrete, recycled/crushed asphalt, and combinations thereof. While desirous to hold an earthen-based material, other filler materials are possible, including synthetics such as plastic or rubber. The filler material can be a filter material, such as activated carbon. The filler material can be any material provides both permeability and aid in load distribution, including optimization thereof.

The outer wall 100-inner wall 102 configuration can aid in functionality of the paver 10 in that it can help contribute load bearing ability since one or more structural support ribs (108a-l, FIG. 1C) can be formed between the outer wall 100 and the inner wall 102.

While the cells 70 and 80 could simply just have a solid thickness instead of walls 100 and 102, the space or gap between the walls aids in construction of the paver. That is, a paver with a solid, wide material thickness would be commercially impracticable to make and use.

The outer wall 100 can have a circular shape with an outer wall diameter 142 and an outer wall height H1. The outer wall diameter can be in a range of about 4" to about 8". In an embodiment the outer wall diameter can be about 6".

The height H1 can be in a range of about 0.5" to about 4". In an embodiment the height H1 can be about 1.5". In an embodiment the height h1 of the outer wall 100 can be substantially equal (+/−0.01") to the height h of the inner wall 102.

The outer wall 100 can have an outer wall thickness 152 that can be in the range of about 0.005" to about 0.5". In an embodiment, the thickness 152 can be about 0.15" to about 0.3"

The top surface 104 can be an integrally formed or connected surface between the outer wall 100 and the inner wall 102. The top surface 104 can be generally planar on its topside and underside.

Although not viewable in the Figures, the top surface 104 can have a top surface thickness that can be in the range of about 0.005" to about 0.5". In an embodiment, the top surface thickness can be about 0.15" to about 0.3"

One or more of the plurality of structural support ribs 108 a-l can be integrally formed between the outer wall 100, the inner wall 102, and the top surface 104. The support rib 108 can have dimensions (such as rib height, rib width, and rib thickness) to accommodate dimensions and structure of the cells 70 and 80. In an embodiment there can be about 10 to about 20 structural support ribs 108. As shown in the Figures, there can be about 12 structural support ribs 108 a-l. The ribs 108 can be positionable between the outer wall 100 and the inner wall 102 in a symmetrical and/or asymmetrical manner.

The paver 10 can include a plurality of third walls 120. There can be at least one third walls 120a conjoining between an at least one respective inner cell 70a and outer cell 80. The third wall(s) 120 can be construed as an area or region where an outer wall of a respective cell comes into a coterminous (or conjoined, integral, etc.) relationship with another outer wall of another respective cell. This helps provide a 'one piece' configuration to the paver 10.

The cells 70 and/or 80 can include a locating rib 24. The locating rib(s) 24 can be used for aiding the position of a marker insert (190, FIG. 3A). The locating rib 24, while integral therewith, can be about a ¼" protrusion from inner wall 102. The locating rib 24 can be about ½" in height. The locating rib 24 can be generally shaped or otherwise configured to mate with a respective insert slot (191, FIG. 3B) of the marker insert.

Each cell 70/80 can have a central point of reference or center point.

One or more of the outer cells 80 and inner cells 70 can also have a bottom permeable portion 110. The bottom permeable portion 110 can be formed integral to a bottom region 156 of the inner wall 102 around its entire diameter 140.

The bottom permeable portion can provide 100% permeability and reduce or remove drainage concerns that are present with conventional paving.

The bottom permeable portion 110 can have a generally flat (horizontal) layer having one or more gaps (e.g., slots, voids, etc.) 158 or slots disposed therein. In an embodiment there can be five gaps 158a-e. The gaps 158 can be sufficient in size and shape to aid in load distribution of the paver 10, but provide adequate permeability for fluids (such as rain) to drain from the surface into the ground. The bottom permeable portion 110 can be in the form of a discernable shape or pattern, such as an "X" (or resemble other letters such as 'I' or 'H'), hashtag (#) zigzag, and so forth.

The bottom permeable portion 110 can be configured with one or more gripping members 112. The gripping members 112 may extend downwardly from the bottom permeable portion 110. The gripping members 112 can help aid in providing stability to the position of the paver 10, and prevent inadvertent or undesirable shifting or movement. Each bottom permeable portion 112 may have a range of about 5 to about 20 gripping members 112.

Although not limited, the gripping members 112 can be pyramidal in shape. The gripping members 112 may extend downwardly below the bottom 126 of the paver 10 (defined by a plane P) a distance D in the range of about 0.01" to about 0.5".

In aspects, the paver 10 can include a density range of about 4 to about 24 pyramidal-shaped gripping members 112 per each respective permeable bottom portion 110.

The gripping members 112 can be either hollow or solid.

The paver may have the top 124 of the paver that can be substantially planar, which can have a plane (not shown) in parallel with P.

In embodiments, the paver 10 can include four inner cells 70 surrounded by a perimeter of twelve outer cells 80.

Figure 1D:
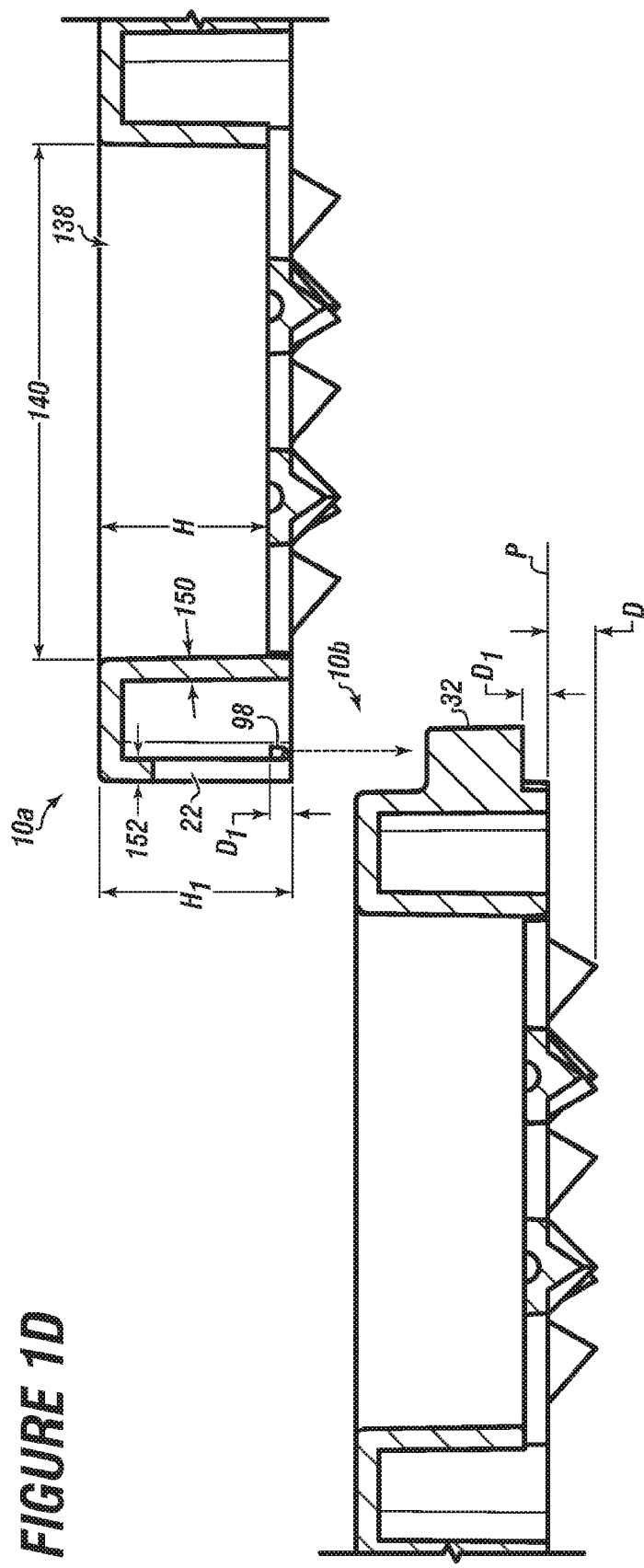
FIG. 1D depicts a cross-sectional view of a first paver (partial) positioned proximate to a second paver (partial) according to one or more embodiments.
Figure 1E:
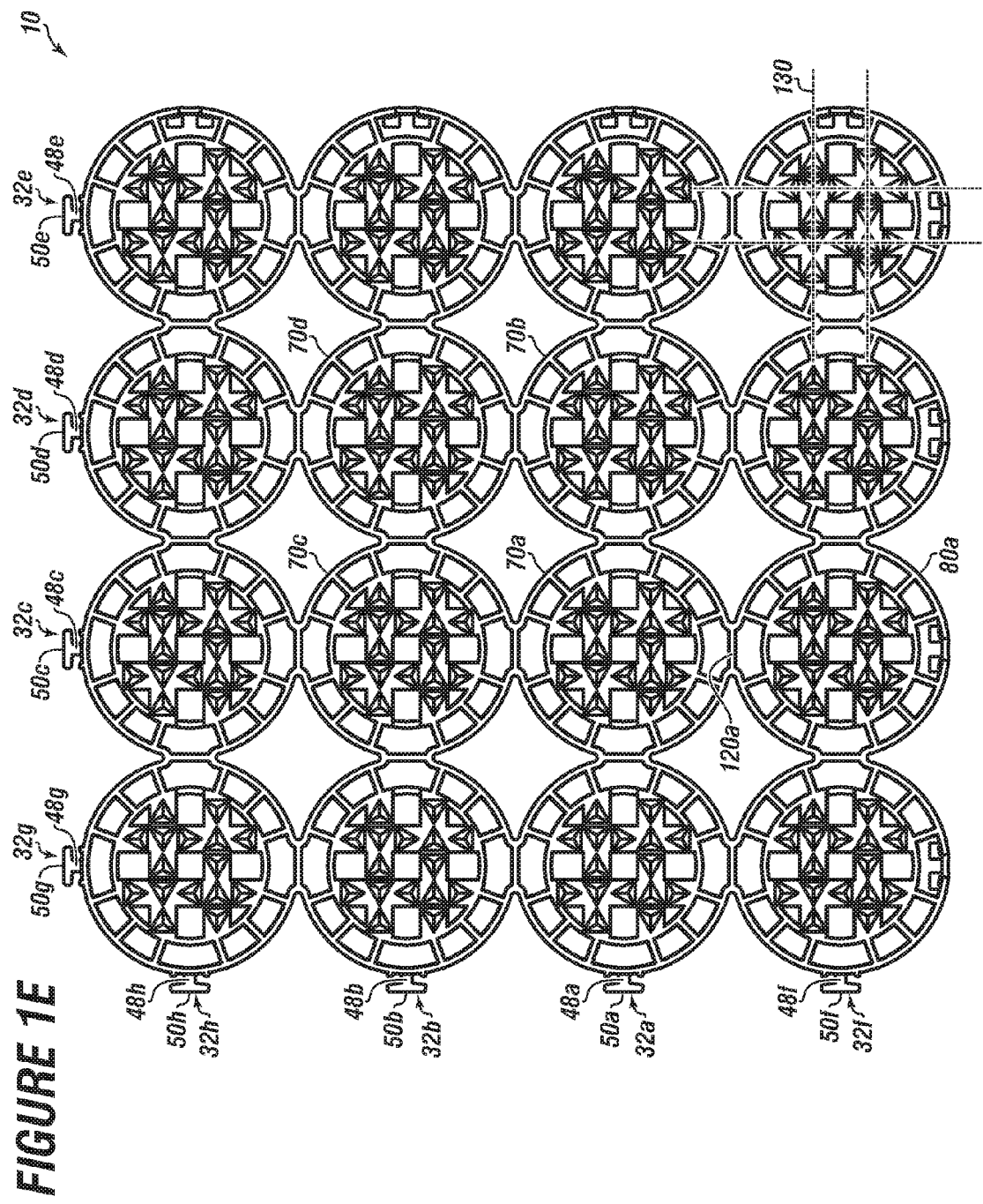
FIG. 1E depicts an upward bottom view of the double walled water permeable modular paver of FIG. 1A according to one or more embodiments.

FIG. 1D illustrates a first paver 10a in proximity to a second paver 10b. As would be apparent to one of skill in the art, the pavers 10a and 10b can be connected together via the respective locking member(s) 32 and keyway(s) 22. The head (50, FIG. 2A) can be supported or engage one or more protruding member(s) 98.

Figure 3B:
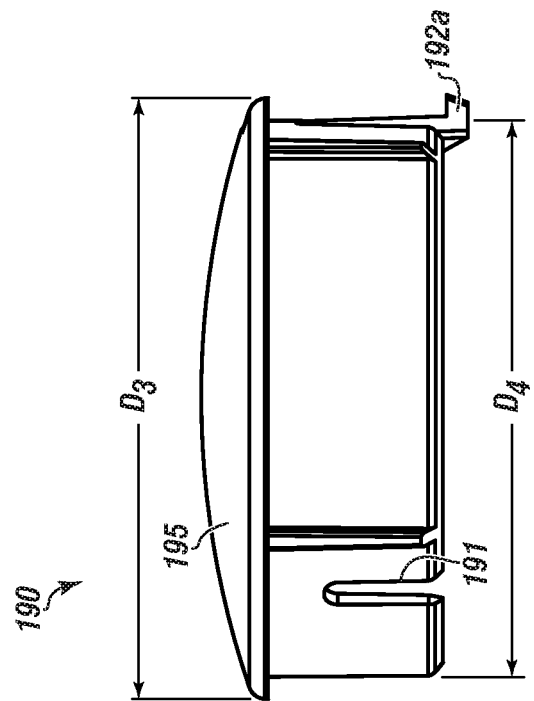
FIG. 3B depicts a side view of the marker insert of FIG. 3A according to one or more embodiments.
Figure 3A:
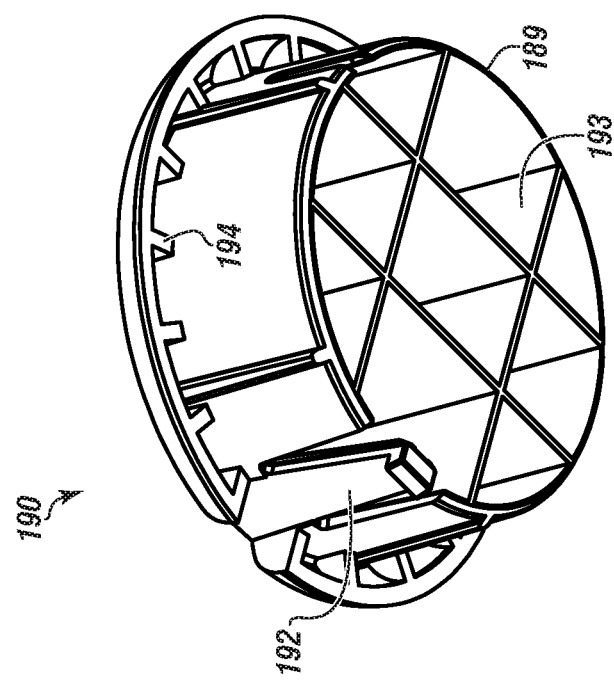
FIG. 3A depicts an upward looking isometric view of a marker for a double walled water permeable modular paver according to one or more embodiments.

Referring now to FIGS. 3A and 3B, an upward looking isometric view, and a lateral side view, of a marker insert 190, in accordance with embodiments disclosed herein, are shown. In embodiments, a marker insert 190 can be insertable into any one of the cells (70 and/or 80, FIG. 1A) of the paver (10). The marker insert(s) 190 can be useable to provide parking guidance to users, such as marking edges of parking spaces. This use of the marker insert 190 enables a user to avoid the need to use the filler material (200, FIG. 5) in the respective cell.

The marker insert 190 can have a circular shaped insert body 189. The insert body can be configured with a plurality of insert support ribs 193. The insert support ribs 193 can help provide load support and structural rigidity to the insert 190.

The marker insert 190 can have an insert head 195. The insert head 195 can be configured in an oversized manner, whereby the appearance of the marker insert 190 can be in resemblance of a 'mushroom'. The insert head 195 can have a head diameter D3 that is larger than a body diameter D4. The body diameter D4 can be substantially equal to inner wall diameter 140. For a tighter tolerance fit, the body diameter D4 can be slightly larger than the inner wall diameter 140, such as by a delta in the range of about 0.001" to about 0.01".

The marker insert 190 can be configured with a plurality of head support ribs 194. The head support ribs 194 can be disposed on an underside of the insert head 195. The marker insert 190 can be configured with a flexible locking dog 192. Upon insertion of the marker insert 190 into a respective cell, the dog 192 will flex inward until the insert 190 comes into approximate contact with the permeable bottom portion 110. As the marker insert 190 can be aligned with locating rib 24, the insert 190 can be configured in a manner whereby the locking dog 192 can move through a respective slot 158. In this respect, the rib 24 can align with insert slot 191. Upon doing so, a bottom lip 192a of locking dog 192 can come into tension rest against the bottom 126 of the paver.

The flexible locking dog 192 can be configured to flex inward into or under the inner wall (102, FIG. 1B) of at least one of an at least one of the plurality of inner cells or outer cells when the marker insert 190 comes into approximate contact with the respective permeable bottom portion (112). In embodiments, the flexible locking dog 192 can engage into a dog slot (157, FIG. 1C) that can be formed in the bottom of the paver (10) in the inner wall 102. The paver can include a plurality of the dog slots (157).

In aspects, the insert head 195 can configured in an oversized manner with a head diameter d3 larger than a body diameter d4. In aspects, the body diameter d4 can be substantially equal to the inner wall diameter (140, FIG. 1B) of at least one of the plurality of inner cells (70, FIG. 1A) or outer cells (80).

The marker insert 190 can be disposed in at least one of the outer cells, the inner cells, and combinations thereof.

The receiving slot can be configured for removably locking the marker insert 190 into the at least one of the plurality of inner cells (70) or outer cells (80).

Referring now to FIG. 2A, a detail view of a locking member 32 according to one or more embodiments of the disclosure, is shown.

The locking member 32 can have a shaft 48 (with a shaft length 49) extending from the outer wall 100 of a respective outer cell 80. The paver (10, FIG. 1A) can include a plurality of locking members 32. One or more locking members 32 can have a shaft 48 that can extend outward from a respective outer wall 100, the shaft 48 being configured to fit within the corresponding keyway (e.g., 22, FIG. 2B).

The locking member 32 can include a head 50 formed integral to the shaft 48. The locking member 32 can have the head 50 connected to the shaft 48 at an angle 47. The head 50 of the locking member 32 can have a head length 61. The head length 61 for the locking member 32 can be larger than the shaft length 49.

The head 50 can have a load surface 51. The load surface 51 can have a slope that matches an outer wall 100 inner surface curvature of the cell 80 enabling the head 50 to mate with a corresponding surface curvature proximate to the keyway of another paver (not shown here).

Each head 50 of the locking member 32 can include a planar outer surface. The load surface 51 can be a rounded inner load support surface or be a surface with curvature. The load surface 51 can be configured to smoothly engage a corresponding rounded inner surface of a second paver outer wall (not shown here). The second paver outer wall can have a second paver outer wall keyway.

The load surface 51 can be linear in lateral cross-section or can have a radii. The angle 47, if present, can be an angle from 80 degrees to 110 degrees from an axis of the shaft 48.

The load surface 51 can have a slope that matches an inner wall surface curvature of a respective cell, thereby enabling the head 50 to mate with a corresponding surface curvature proximate to the keyway of another paver (not shown here).

A first sloped edge 52 can extend from the outer wall 100 of the outer cell 80. The first sloped edge 52 can be parallel with and spaced apart from the shaft 48 and also in a spaced apart relationship to the head 50.

An outer edge 63 of the first sloped edge 52 can have a curvature complimentary to the outer wall curvature of a cell of another paver having a corresponding keyway (not shown here) into which the head 50 interlocks.

The outer length aspect of the first sloped edge 52 can have a width larger where the first sloped edge attaches to the outer wall 100 than the width at the outer edge 63. The first sloped edge can be tapered in embodiments.

A second sloped edge 53 can extend from the outer wall 100 of the outer cell 80.

The second sloped edge 53 can be parallel with and spaced apart from the shaft 48 and can also be in a spaced apart relationship to the head 50.

The second sloped edge 53 can be opposite the first sloped edge 52.

The first and/or second sloped edges 52, 53 can be suitable to provide tension support (via a snug tolerance fit) with a second paver outer wall of a second paver outer cell. Thus, the distance (or clearance) D2 can be slightly less than an outer wall thickness of the second paver.

An outer edge 55 of the second sloped edge 53 can have a curvature complimentary to the outer wall curvature of a cell of another paver having a corresponding keyway (not shown here) into which the head 50 interlocks.

The outer length aspect of the second sloped edge 53 can have a width larger where the second sloped edge attaches to the outer wall 100 than the width at the outer edge 55. The second sloped edge can be tapered in embodiments.

The head 50 can be planar, while load surface 51 can be rounded. In this respect the load surface 51 can be configured to smoothly engage a corresponding rounded inner surface of an outer wall (associated with a respective keyway) of a second paver.

Referring now to FIGS. 2B and 2C, an upward looking view of a tapered protruding member formed on an inner surface of an outer wall of an outer cell of a first paver, and a side view of the tapered member engaged with a locking member of a second paver, in accordance with embodiments of the disclosure, are shown. FIGS. 2B and 2C illustrate together that an outer wall 100 (of a respective outer cell 80) can have an outer wall inner surface 99 and an outer wall outer surface 101. The outer wall inner surface 99 can have disposed or formed thereon one or more tapered protruding member 98.

When a traversable surface (201, FIG. 5) is formed, multiple pavers 10 are interlocked together. In doing to, the head(s) (50, FIG. 2A) of a respective locking member(s) 32 of a first paver can initially come into contact of a tapered surface(s) 97 of another paver. The head rides up a distance D1, and then once past end point 96, will snap into place and be supported thereon.

Figure 4:
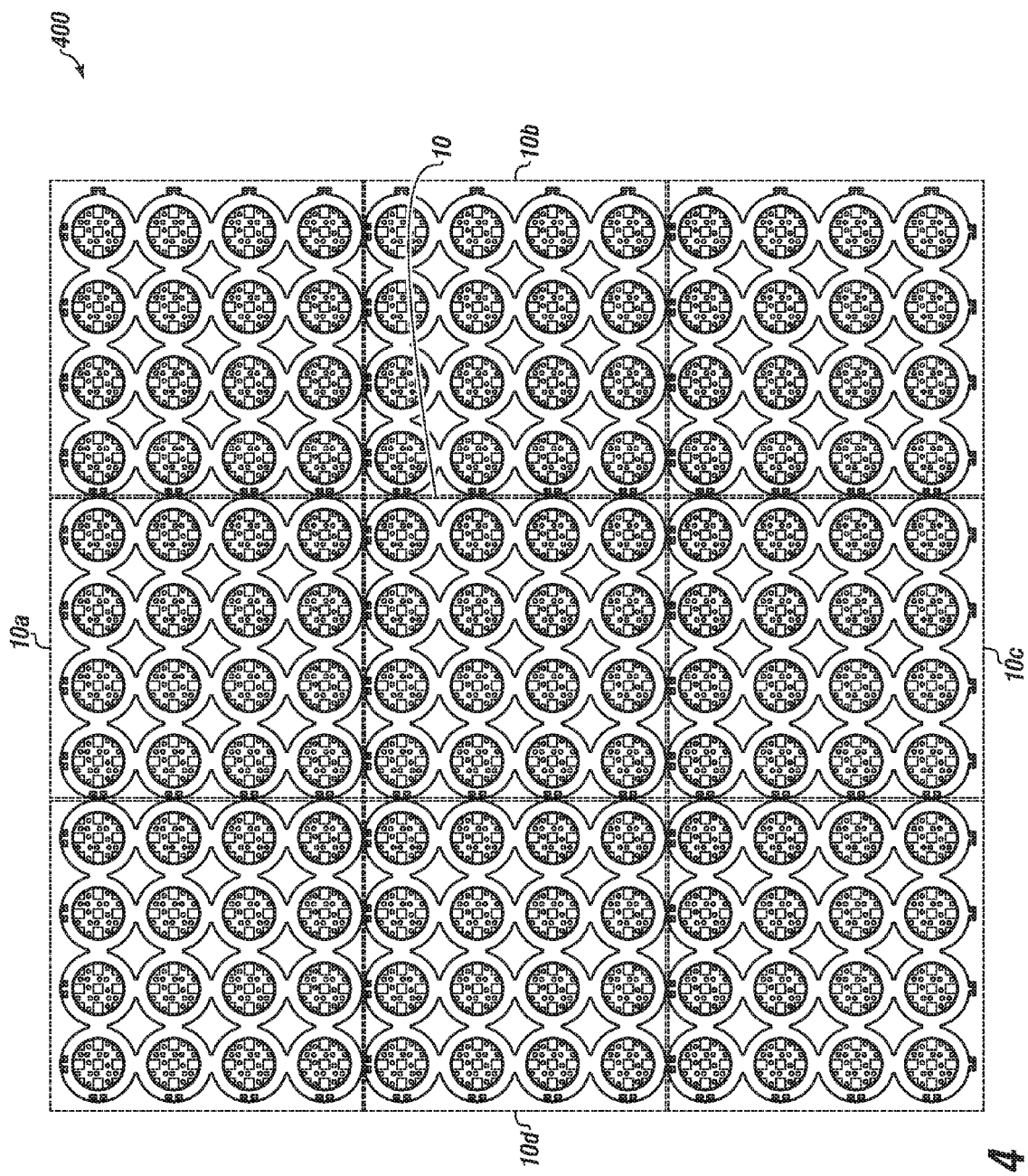
FIG. 4 depicts a downward view of a system of interconnectable double walled water permeable modular pavers connected together according to one or more embodiments.

Referring now to FIG. 4, a downward view of a system of interconnectable double walled water permeable modular pavers connected together, according to embodiments of the disclosure, is shown.

FIG. 4 illustrates the paver 10 can be configured for interlocking connection to one or more of a plurality of additional pavers 10a-d (with additional pavers connected to those pavers). The paver 10 can be configured for interlocking connection at a "12 o'clock position" to paver 10a (position "A"), a "3 o'clock position" to paver 10b (B), a "6 o'clock position" to paver 10c (C), and a "9 o'clock position" paver 10d (D).

Although the pavers 10 shown in FIG. 4 are identical, it is within the scope of the disclosure that various pavers of the system can be different. As would be apparent to one of skill in the art, it is also within the scope of the disclosure that a paver could have more than four connection clock "positions". For example, a six-sided paver can have six connecting clock positions (e.g., 2, 4, 6, 8, 10, and 12).

The locking member of the paver 10 can interlock with the keyways of a respective adjacent water permeable paver 10a, b, c, and/or d. The interconnected pavers can be part of a system 400 useable to create a roadway, trail, or similar traffic surface.

Referring now to FIG. 5, a partial view of plurality of double walled earth grabbing permeable pavers interlocked together to form a paver system for use as a traversable load bearing surface, in accordance with embodiments of the disclosure, is shown.

They system 400 can include a plurality of pavers 10. One or more of the plurality pavers 10a, 10b, etc. can include a filler material 200 therein.

The pavers 10 of system 400 can be interlocked together by mating locking members 32 of one paver 10a with keyways of another paver 10b. The plurality of pavers can be connected together to form a surface 201. The surface 201 can be load-bearing in a sufficient to support a respective load, such as a parked or moving vehicle 203.

The pavers 10 of system 400 can include a plurality of insert markers 190. Although not limited to any particular pattern, the insert markers 190 can be inserted into the pavers 10 of system 400 in a manner that forms a line 204 or other desired marker pattern. Multiple lines 204 can be created to form, for example, a marked parking spot.

It should be appreciated that although shown here in a partial view as a few pavers, that as many pavers that are necessary to form the desired surface (such as a road, a traffic lane for a road, or a parking lot space) can be used together in an interlocking manner accordingly.

In addition, although not illustrated here, it should be appreciated and apparent that the system 400 can be readily and easily positioned onto or into an earthen surface at a preset geographic area.

In embodiments, the double walled water permeable modular paver can be made from recycled plastics, such as milk bottles.

In embodiments, the double walled water permeable modular paver can be pigmented with soy based pigments to be environmentally friendly.

Referring now to FIGS. 6A-6C, a partial view of a double walled earth grabbing permeable paver having a pair of outer wall bottom ribs, a partial view of a double walled earth grabbing permeable paver having a pair of outer wall top ribs, and an underside view of first paver engaged with a second paver according, in accordance with embodiments of the disclosure, are shown.

FIGS. 6A-6C together illustrate a first paver 10a and a second paver 10b. Paver 10a, paver 10b, or both pavers 10a and 10b, can be comparable or identical in aspects, dimensions, function, operation, components, manufacture, etc. as that of pavers for System 400, or other pavers 10 described herein, and redundant discussion is limited for sake of brevity.

FIG. 6A shows, in part, a first paver 10a having a keyway 22a. In proximity to the keyway 22a can be one or more outer wall bottom ribs 171 a,b. The outer bottom wall ribs 171 a,b can be proximate to a bottom 126 of the paver 10a. The paver 10a can include one or more stabilizer ribs 179a.

FIG. 6B shows, in part, a second paver 10b having a locking member 32b. In proximity to the locking member 32b can be one or more outer wall top ribs 172 a,b. The outer wall top ribs 172 a,b can be proximate to a bottom 126b of the paver 10b. As shown in FIG. 6C, when the first paver 10a is connected with the second paver 10b, the top ribs 172 a,b and bottom ribs 171 a,b can engage with each other. Similarly, stabilizer rib 179a can be engaged with head 50b. The contact between the stabilizer rib 179a and head 50b can help reduce or eliminate wobble or other undesired movement between connected pavers 10a and 10b.

Bottom ribs 171 a,b can include a bottom rib planar surface, such as bottom rib planar surface 173a. Similarly, top ribs 172 a,b can include a top rib planar surface, such as top rib planar surface 174b. As the pavers 10a and 10b are connected together, bottom ribs 171 a,b and top ribs 172 a,b can be movingly engaged with respective rib tapered surfaces 175 and 176, as would be apparent to one of skill in the art. Once the pavers 10a and 10b are connected together, the planar surfaces 173a and 174b can be engaged. The use of planar surfaces 173a and 174b can provide additional load support and distribution with connected pavers 10a and 10b.

The locking member 32b can include a rounded inner load surface 51b. The rounded inner load surface 51b can be configured to smoothly engage a corresponding rounded inner surface 99a of first paver outer wall 100a, such as shown in FIG. 6 at contact point 177.

The load surface 51b can have a slope that matches an outer wall 100a surface curvature for its inner surface 99a, which can enable the head 50b to mate with the corresponding surface 99a proximate to the keyway 22a.

An outer sloped edge 53b can have a curvature complimentary to the outer wall 100a curvature for outer wall surface 101a, which can enable to the pavers 10a and 10b to come into contact at contact point 178.

Installing the double walled water permeable modular pavers can be a simple six step process.

The process can include clearing and grading a ground surface, as the first step. This clearing and grading can be done by hand with a shovel for a small area or with a bulldozer or other suitable construction or industrial equipment for a large area.

The process can include laying and spreading ½ an inch to 8 inches of ½ inch to 1 and ½ inch diameter rock or gravel onto the cleared and graded ground, as the second step. This layer of rock or gravel can be compacted or compressed with a roller or compactor.

The process can include preassembling the double walled water permeable modular pavers into four interconnected pavers with the locking tabs interlocking into the slots, as the third step.

The process can include placing the preassembled double walled water permeable modular pavers over the compacted or compressed rock or gravel, as the fourth step, and repeating as necessary to form the desired surface.

The process can include dumping the aggregate into the cells of the double walled water permeable modular pavers, as the fifth step. From ¾ inch to 1 and ½ inch rock, recycled asphalt, or other aggregate can be used to evenly fill the cells of the pavers.

The process can also include compacting the filled cells, forming a parking lot or traversable traffic surface ready to use for 25-plus years without maintenance, as the sixth step.

A process to create a stabilized water permeable traversable surface can include performing steps one, two, three and four as described above. After laying the pavers, the process can include filling the cells of the double walled water permeable modular pavers with soil instead of aggregate and installing seed or sod as desired.

Foot paths can also be created with the double walled water permeable modular pavers. Any size path can be made with the double walled water permeable modular pavers.

While preferred embodiments of the disclosure have been shown and described, modifications thereof can be made by one skilled in the art without departing from the spirit and teachings of the disclosure. The embodiments described herein are exemplary only, and are not intended to be limiting. Many variations and modifications of embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that can have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A double walled earth grabbing water permeable modular paver comprising:
   a. a first group of outer cells, each of the first group of outer cells comprising a keyway;
   b. a second group of outer cells, each of the second group of outer cells comprising a locking member;
   c. a third group of outer cells, each of the third group of outer cells comprising a respective keyway and a respective locking member;
   d. a fourth outer cell comprising two keyways;
   e. a fifth outer cell, comprising two locking members; and
   f. a plurality of inner cells;
   wherein at least one of the first group of outer cells is connected to the fourth outer cell, wherein at least one of the first group of outer cells is connected to an adjacent cell of the third group of outer cells, and is also connected to at least one of the plurality of inner cells, wherein at least one of the second group of outer cells is connected to at least one of: an adjacent cell of the third group of outer cells, to the fifth outer cell, to one of the plurality of inner cells, and combinations thereof; and wherein each of the plurality of outer cells and inner cells further comprise: an outer wall; an inner wall; a top surface integrally connected between the outer wall and the inner wall; and a plurality of structural support ribs integrally connected between the top surface, the outer wall, and the inner wall; a permeable bottom portion engaging each inner wall; and a plurality of gripping members extending from the permeable bottom portion.

2. The double walled earth grabbing water permeable modular paver of claim 1, further comprising a plurality of third walls, each third wall connecting either one of the outer cells with one of the inner cells, one of the outer cells with another one of the outer cells, or one of the inner cells with another one of the inner cells.

3. The double walled earth grabbing water permeable modular paver of claim 1, further comprising a marker insert disposed in at least one of the outer cells, the inner cells, and combinations thereof.

4. The double walled earth grabbing water permeable modular paver of claim 3, wherein the marker insert comprises: an insert head configured in an oversized manner with a head diameter larger than a body diameter, wherein the body diameter is substantially equal to an inner wall diameter of at least one of the plurality of inner cells or outer cells.

5. The double walled earth grabbing water permeable modular paver of claim 4, wherein the marker insert comprises a flexible locking dog configured to flex inward into or under the inner wall of an at least one of the plurality of inner cells or outer cells when the marker insert comes into approximate contact with the respective permeable bottom portion.

6. The double walled earth grabbing water permeable modular paver of claim 5, comprising a receiving slot configured for removably locking the marker insert into the at least one of the plurality of inner cells or outer cells.

7. The double walled earth grabbing water permeable modular paver of claim 1, wherein the locking members for each respective outer cell is formed integral to the respective outer wall between a bottom of the paver and a top of the paver.

8. The double walled earth grabbing water permeable modular paver of claim 7, wherein the keyways for each respective outer cell are cut from the bottom of the paver partially towards the top of the paver.

9. The double walled earth grabbing water permeable modular paver of claim 1, wherein each locking member comprises:
   a. a shaft extending outward from one of the outer walls, the shaft being configured to fit within a corresponding keyway of a second paver; and
   b. a head extending outward from the shaft and formed integral with the shaft.

10. The double walled earth grabbing water permeable modular paver of claim 9, wherein each head of the locking member comprises a planar outer surface and a rounded inner load support surface, wherein the rounded inner load support surface is configured to smoothly engage a corresponding rounded inner surface of a second paver outer wall of the second paver, the second paver outer wall having the corresponding keyway formed therein.

11. The double walled earth grabbing water permeable modular paver of claim 1, wherein the top surface is substantially planar, wherein the paver is made of recycled plastic, and wherein the plurality of inner cells consist of four inner cells, and wherein the plurality of outer cells consist of twelve outer cells.

12. The double walled earth grabbing water permeable modular paver of claim 1, wherein the permeable bottom portion comprises a predetermined pattern in the form of at least one of an I, H, X, W, M, L, Z, and '#' symbol.

13. The double walled earth grabbing water permeable modular paver of claim 1, wherein each of the outer cells and the inner cells comprise a locating rib formed on the respective inner wall.

14. The double walled earth grabbing water permeable modular paver of claim 1, comprising a first sloped edge extending from the outer wall of the outer cell, and a second sloped edge extending in parallel from the outer wall of the outer cell on either side of a shaft.

15. The double walled earth grabbing water permeable modular paver of claim 1, wherein the gripping members can be pyramidal in shape, and wherein the paver further comprises a density range of about 4 to about 24 pyramidal-shaped gripping members per each respective permeable bottom portion.

16. The double walled earth grabbing water permeable modular paver of claim 1, wherein the gripping members are either hollow or solid.

17. The double walled earth grabbing water permeable modular paver of claim 1, wherein the locking member comprises a head connected to a shaft at an angle, the head having a head length and the shaft having a shaft length, and wherein the head length is larger than the shaft length.

18. The double walled earth grabbing water permeable modular paver of claim 17, wherein the head has a load surface, wherein the load surface has a slope that matches an inner wall surface curvature of a respective cell, thereby enabling the head to mate with a corresponding surface curvature proximate to the keyway of another paver.

19. The double walled earth grabbing water permeable modular paver of claim 1, comprising a light module in at least one of the outer cells, the inner cells, and combinations thereof.

20. The double walled earth grabbing water permeable modular paver of claim 1, comprising a plurality of double walled earth grabbing water permeable modular pavers to create a load bearing traffic surface.

* * * * *